Aug. 2, 1927.
H. Y. LAW
TRACTOR CHAIN
Filed Nov. 24, 1920
1,637,777
3 Sheets-Sheet 1
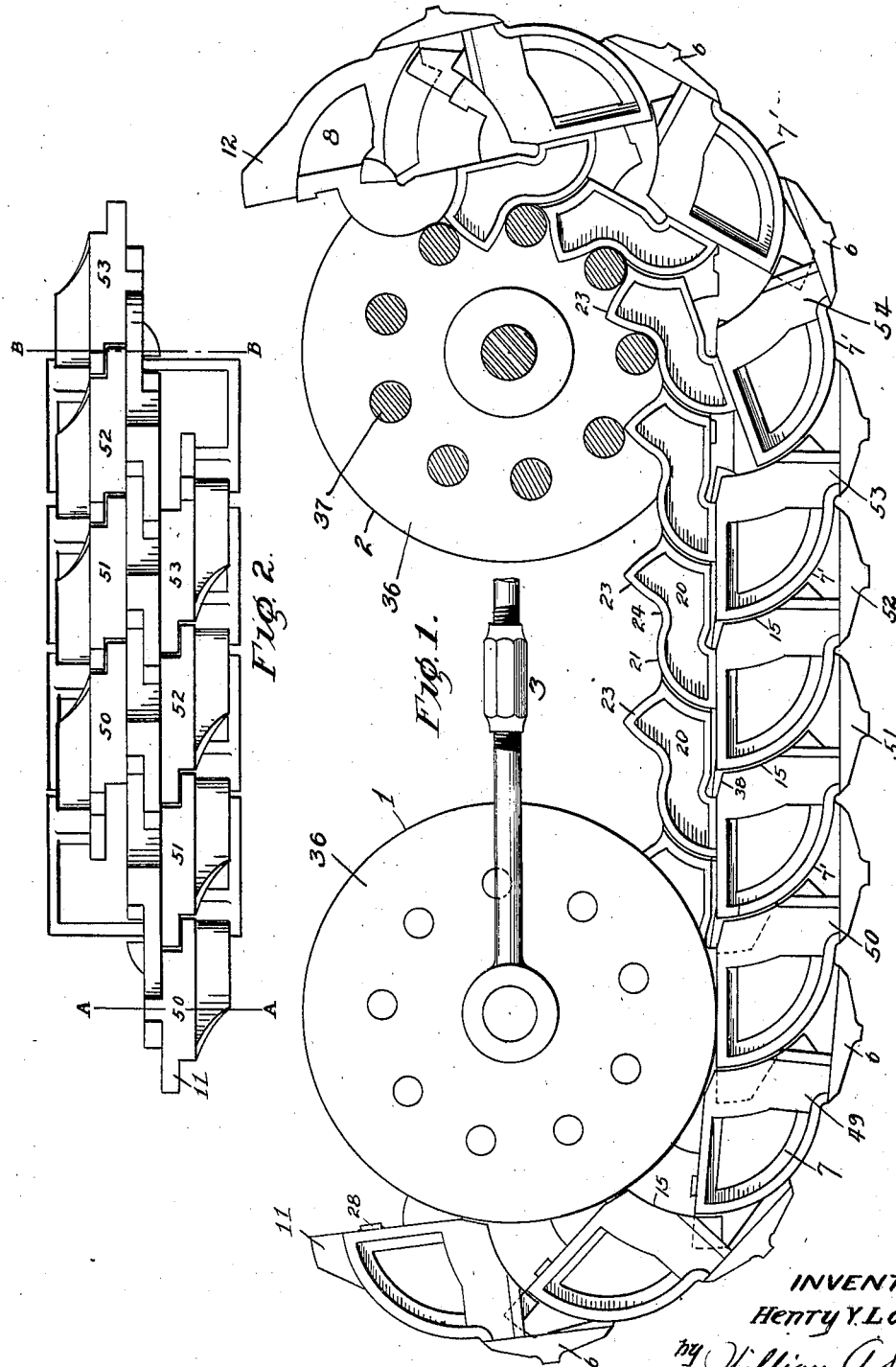
INVENTOR
Henry Y. Low
by William A. Stark
Atty.

Aug. 2, 1927.

H. Y. LAW

TRACTOR CHAIN

Filed Nov. 24, 1920

INVENTOR
Henry Y. Law
by William A. Stock
Atty.

Aug. 2, 1927.

H. Y. LAW

TRACTOR CHAIN

Filed Nov. 24, 1920

INVENTOR.
Henry Y. Law.
by Chas E Townsend
Atty.

Patented Aug. 2, 1927.

1,637,777

UNITED STATES PATENT OFFICE.

HENRY Y. LAW, OF MERCED, CALIFORNIA.

TRACTOR CHAIN.

Application filed November 24, 1920. Serial No. 426,134.

This invention relates to endless chain tracks for tractors and the like.

The object of the invention is to overcome well recognized defects which are inherent in all tracks heretofore in use, and also to improve the operation of the track, and to increase the strength and wearing qualities of the same.

In all prior structures of this type the links have been pivotally connected together at their ends, and the rail surfaces have been disposed between the pivot points. The disadvantage of this is found in the fact that unless the sprocket wheels are elevated above the load carrying trucks, so as not to sustain any load, the links in passing around the sprocket wheels will vibrate the latter and will also dig into the ground. Where the sprocket wheels are used to sustain a portion of the load, then a link will be carrying considerable weight when it is in a tilted position, about to pass around a sprocket wheel. Practically all successful tractors make use of load carrying devices between the sprocket wheels and elevate the latter so that they are not required to support any of the weight of the tractor.

Some attempts have been made to dispense with load carrying trucks between the sprocket wheels by constructing the links so that they do not flex inwardly, but all of these attempts have been unsuccessful for the reason that the sprocket wheels then have to serve as load carriers and the action of the tilting links is such as to vibrate the wheels and cause the links to dig into the ground and otherwise interfere with the smooth operation of the track.

My new track is so constructed that any particular link always has its shoe fully and completely on the ground in a horizontal position as long as the related rail is supporting any weight. It is not until after the rail is relieved of its load that the link starts to flex and on the other end of the track the shoe is always in horizontal position on the ground before the sprocket wheel rides on to the related rail. This action is due to the fact that the links are not connected together at their ends, but rather at points set in from each end. The rail surfaces extend from the projecting end of the link to the point of articulation and that portion of the link between the points of articulation has no rail surfaces. In passing around the sprocket wheel the only part of the link to contact with the rim of the wheel is the inner end of each rail surface. The links, therefore, move around the sprocket wheel with a smooth and easy action. The fact that they do not lift the wheels or dig themselves into the ground, makes such a track ideally suited for use without load carrying trucks between the sprocket wheels. I, therefore, provide means for preventing the links from flexing inwardly so that all of the track on the ground will serve to support the load.

Instead of using the conventional pivot pins, I employ rocker lugs which form the pivots for the links. Thereby all friction surfaces are eliminated and the life of the track is greatly increased. The links are held together laterally by means of arcuate guides at each end of the link.

The various links of the track are constructed so that earth and similar matter is readily squeezed out and does not tend to clog the parts and prevent their proper functioning. The manner in which the parts roll on one another does away with considerable loss by friction and therefore with wear.

With these and incidental objects in view, the invention consists in certain novel features of construction and combinations of parts, the essential elements whereof are recited in the appended claims and a preferred form of embodiment of which is described in detail hereinafter and illustrated in the accompanying drawings which form a part of this specification.

Reference being had to the accompanying drawings forming a part of this specification:

Figure 1 is a view in side elevation showing two supporting wheels of the tractor with a section of my improved track between these wheels.

Figure 2 is a view in plan of several links as when assembled.

Figure 3:
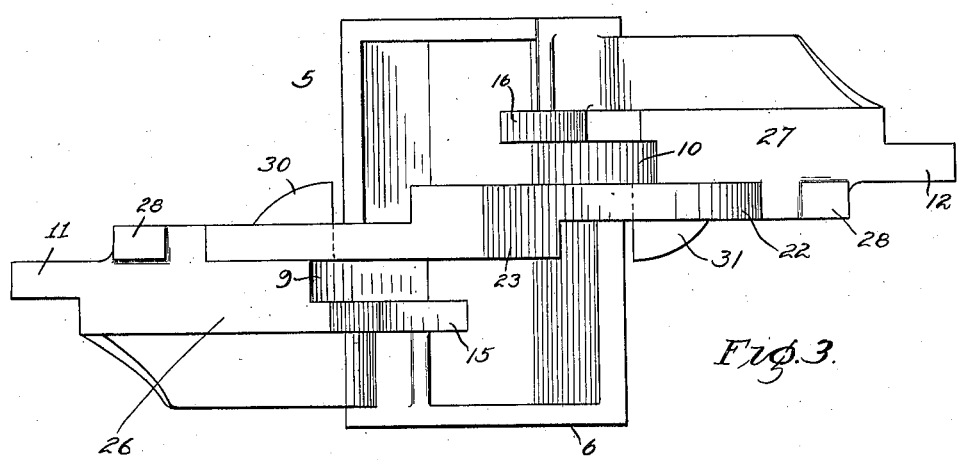
Figure 3 is a view in plan of a single track link.
Figure 4:
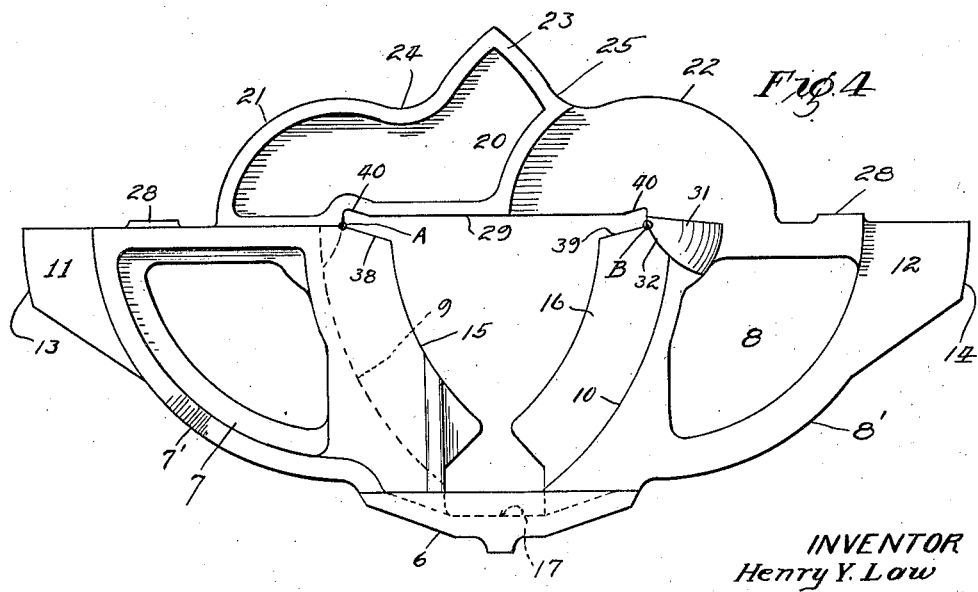
Figure 4 is a view in side elevation of the same.
Figure 5:
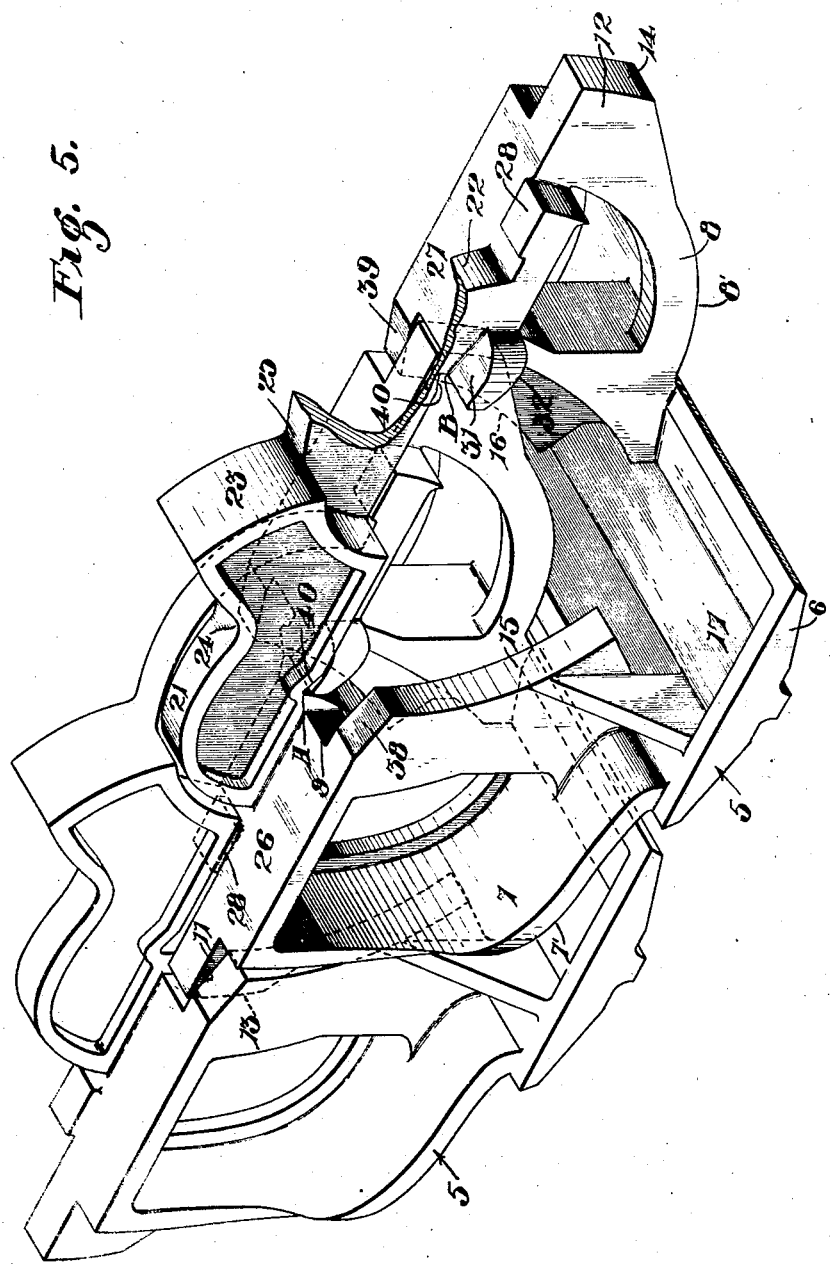
Figure 5 shows a perspective view of two of the links.

Referring to corresponding parts in the several views by the same numerals of reference: 1 denotes a driving wheel and 2 an idler wheel, these wheels being held in spaced relation by means of the adjustable rods 3. My improved track passes around the wheels 1 and 2 and is formed of links which are denoted in general by 5. Each of these links is of the same construction and comprise an extension tread 6. Extending outwardly from each side of this tread, are segmental portions 7 and 8 which are symmetrically disposed on opposite sides of the longitudinal and transverse center line of the tread 6. The outer curve 7' of the extension member 7 is struck from a center denoted by A, while the center of the arcuate surface 8' of extension 8 is denoted by B. On the inside of the extension members 7 and 8 are formed curved surfaces 9 and 10 respectively, having their centers at B and A respectively.

Formed on the outer ends of the members 7 and 8 are lugs 11 and 12. These lugs have their outer ends shaped on arcs, the centers of which are in the points A and B respectively. The radii of the arcs 13 and 14 are slightly less than those of the surfaces 9 and 10 so that when assembled the arcs on the ends of the lugs are positioned within the adjacent arcuate surfaces 9 and 10. Extending outwardly on one side of the arcs 9 and 10 are wings 15 and 16, the outer edges of which are also arc shaped and have slightly greater radii than the outer surfaces of the arcs 7 and 8. These wings form guides for contact with the outside of lugs 11 and 12 to prevent lateral movement of the links when they are assembled. It will be noted that the tread 6 is hollowed out as shown at 17, this hollow being provided in order to secure a greater length of the wings and yet permit the assembling of the links. The distance from the lower edge of the wings to the bottom of the recess 17 is greater than the width across the outer ends of the lugs 13 and 14, so that in assembling, the links are held at such an angle that the lug 13 may enter the recess 17 outside of the wing 15. Then by a side movement, the lug is moved past the lower end of the wing and straightened out to bring the lug into the slot formed between the wing 15 and guide surface 9.

The two segmental portions of the link are connected across their upper ends by means of the bridge member 20. This member comprises the offset curved portions 21 and 22, the radii of which are in the centers A and B respectively. In the center of the bridge is an upward projection 23 which forms a tooth for engagement with the pins of the driving wheel. This tooth is connected by the curved portions 24 and 25 with the portions 21 and 22. When the links are engaged by the wheels, the curved portion 24 of one link lies adjacent the curved portion 25 of the adjacent link, forming a substantially semi-circular recess for engagement with the driving pins. The upper surfaces of the extension members 7 and 8 form rail surfaces 26 and 27 on which the supporting wheels roll. The under surface 29 of the bridge 20 is placed somewhat above the rail surfaces just mentioned, and I provide on the rail surfaces small abutment pads 28 for contact with the under surface of the bridge. Extending outwardly from the inside surfaces of the members 7 and 8 are rocker lugs 30 and 31. These lugs have curved contact surfaces 32 which roll on the corresponding surfaces of the lugs of the adjacent links. This curved surface passes through the centers A and B and is so selected that when the links are bent with reference to each other they move substantially as though the links were pivotally mounted about the points A and B. The curve of each of these lugs is extended under the bridge 20, and it is this part of the curve which contacts with the lug of the associated link. This construction gives a width of contact which is twice that of the lugs themselves. The inner point of the lugs is substantially in the same plane as the surface 29 and as the lug of one link extends under the bridge of the adjacent link, I provide the small notches 40 to give clearance. The supporting wheels 1 and 2 are of the lantern type comprising the two discs 36 between which are held pins 37. The discs are spaced apart a distance slightly greater than the width of the bridge and the thickness of the discs in substantially the same as the width of the surfaces 26 and 27.

In use, the links are assembled in the manner previously described, and the track formed by the links passes over the two supporting wheels. During the process of assembling the latter are moved towards each other in order to give sufficient slack so that the two end links of the track may bend at an angle to each other to permit the lateral movement whereby the lugs 11 and 12 may be entered back of the wings 15 and 16, when the wheels are moved apart to hold the links straight. The track between the two supporting wheels which rest on the ground, tends to be pressed upwardly between the two wheels, or in other words that portion of the track directly under the wheels tends to sink into the ground to a greater extent than that between the wheels. With the improved construction here illustrated, the links form a truss between the wheels whereby the bending of the track is prevented, the track being straight between the supporting wheels carries a uniform load over all portions. The action whereby this truss effect is secured is obtained by contact of the pads 28 with the surfaces 29 outside of the pivot points of the links. The roller surface formed by the surfaces 26 and 27 is a substantially straight line. This surface always extends beyond a perpendicular plane through the axis of rotation of the wheels so that the latter do not tend to climb or drop about the time the links break around the wheels. This is illustrated in Figure 1, where the outer circumference of the wheel 1 rests on the surface 26 of link 50, while the wheel 2 is just leaving the tip of lug 12 on link 52 and rests on surface 27 of link 53. All of these links are flat on the ground and hence horizontal giving a flat rolling surface. Link 49 has just started to break away from the straight track, while link 54 will be flat before wheel 2 reaches the end of the surface 27 of link 53.

The upper corners of wings 15 and 16 are cut away at an angle as shown at 38 and 39 and during the time the links move around the wheels these beveled ends are seated on the periphery of the discs. There being no rail surfaces between these beveled ends, the central portion of the link when the latter is flexed is free to move inwardly toward the center of the sprocket wheel, so that while the links between the wheels have the tread surfaces tangent to the peripheries of the discs, the plane of the same surfaces of the links passing around the wheels falls within the periphery of the discs. This allows the tread surfaces to be picked off of the ground without any portion thereof projecting outwardly from the center of the wheel a greater distance than when the links form in a straight line between the two wheels. This action allows the links to pass on to the supporting wheels without the edge of the tread portions digging into the earth or raising the wheel. The latter action would invariably take place where the rail surfaces are formed between the pivots. By allowing the center to move inwardly towards the axis of rotation, this action is overcome and the links enter and leave the wheels with a smooth action.

Having thus described my invention, I claim as new and wish to cover by Letters Patent:

1. A tread chain comprising a plurality of links each consisting of two offset spaced arcuate members, a tread plate connecting the lower ends of the arcuate members, a bar connecting the upper ends of the arcuate members, rocker contact lugs formed on the upper inside corners of said members, said lugs being adapted to engage the corresponding lugs of adjacent links to pivotally connect them, said members having arcuate grooves on their opposed faces, extension lugs formed on the outer ends of said members for engagement by the grooves of adjacent links, rail surfaces on the upper sides of said members and lugs laterally displaced from the rail surfaces and adapted to contact with the under surface of the said connecting bar to prevent flexure of the chain in an upward direction.

2. An endless chain track made up of articulated links, each having a central, longitudinal web portion overlying the tread surface, and a lateral projection at each end of the shoe extending in opposite directions and forming rocker lugs adapted to be engaged by corresponding lugs on adjacent shoes, and an arcuate guide member formed in the transverse plane of each lug, each link having a projecting end portion formed with a curved surface to fit into the arcuate guide member of the adjacent link.

3. In combination with a sprocket wheel having spaced side plates and pin teeth extending between them, an endless chain track comprising a series of articulated links, each link formed with extension rail surfaces at its opposite ends to engage the plates of said sprocket wheel, and an intermediate centrally arranged upstanding web portion forming a tooth to engage the pin teeth of the sprocket wheel, said web portion being cut away on its underside in the plane of the rail surfaces, adjacent links being overlapped at their ends, and a portion on the overlapping ends of the links to extend under the web portion of the adjacent link, whereby to lock the track against upward flexing.

In testimony whereof I affix my signature.

HENRY Y. LAW.